United States Patent
Becker

(10) Patent No.: US 11,021,354 B2
(45) Date of Patent: Jun. 1, 2021

(54) INDUSTRIAL TRUCK HAVING A HYDRAULIC FLUID TANK

(71) Applicant: Jungheinrich Aktiengesellschaft, Hamburg (DE)

(72) Inventor: Marion Becker, Norderstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 6 days.

(21) Appl. No.: 16/291,072

(22) Filed: Mar. 4, 2019

(65) Prior Publication Data
US 2019/0270628 A1 Sep. 5, 2019

(30) Foreign Application Priority Data
Mar. 5, 2018 (DE) ...................... 10 2018 105 009.7

(51) Int. Cl.
*B66F 9/22* (2006.01)
*B66F 9/075* (2006.01)

(52) U.S. Cl.
CPC ............ *B66F 9/22* (2013.01); *B66F 9/07518* (2013.01); *B60Y 2200/40* (2013.01); *Y10T 137/6855* (2015.04)

(58) Field of Classification Search
CPC .. B66F 9/07518; B66F 9/22; Y10T 137/6855; E02F 9/0883
See application file for complete search history.

(56) References Cited

U.S. PATENT DOCUMENTS

| | | | | |
|---|---|---|---|---|
| 1,039,098 A | * | 9/1912 | Coffin | B60P 3/221 220/564 |
| 1,611,906 A | * | 12/1926 | Gurney | B60K 15/067 280/834 |
| 6,435,557 B1 | * | 8/2002 | Palvoelgyi | B60K 15/03 220/4.14 |
| 6,886,861 B2 | * | 5/2005 | Marsala | B60K 15/01 280/830 |
| 7,045,708 B2 | * | 5/2006 | Miura | F16B 21/088 174/50 |
| 7,497,290 B2 | * | 3/2009 | Marsala | B60K 15/073 180/69.1 |
| 8,205,313 B2 | * | 6/2012 | Kaneyasu | B60K 15/067 188/268 |
| 8,752,581 B2 | * | 6/2014 | Haslberger | B66F 9/07518 137/262 |

(Continued)

FOREIGN PATENT DOCUMENTS

| DE | 8608045 U1 | 5/1986 |
|---|---|---|
| DE | 102011004596 A1 | 6/2012 |

(Continued)

OTHER PUBLICATIONS

DE 10 2018 105 009.7; filed Mar. 5, 2018; German Search Report dated Mar. 1, 2019; 8 pages.

(Continued)

*Primary Examiner* — Kevin F Murphy
(74) *Attorney, Agent, or Firm* — Barclay Damon LLP

(57) ABSTRACT

An industrial truck comprises a support having a plurality of receptacles and a hydraulic fluid tank comprising a plurality of feet engaged with a bottom surface of the hydraulic fluid tank. Each of the plurality of feet is configured to be received by one of the plurality of receptacles.

13 Claims, 5 Drawing Sheets

(56) References Cited

U.S. PATENT DOCUMENTS

| | | | | |
|---|---|---|---|---|
| 9,156,347 | B2* | 10/2015 | Inaba | B60K 15/067 |
| 9,494,211 | B2* | 11/2016 | Seko | F16F 15/08 |
| 9,579,972 | B2* | 2/2017 | Taniguchi | B60K 15/067 |
| 2004/0200356 | A1* | 10/2004 | Kuperus | B60K 15/03504 |
| | | | | 96/147 |
| 2012/0192966 | A1* | 8/2012 | Siebeneick | B60K 15/067 |
| | | | | 137/376 |

FOREIGN PATENT DOCUMENTS

| | | |
|---|---|---|
| JP | H06 191297 A | 7/1994 |
| JP | H11 322292 A | 11/1999 |

OTHER PUBLICATIONS

EP 19159787.1; filed Feb. 27, 2019; European Search Report dated Jul. 25, 2019; 10 pages.

* cited by examiner

INDUSTRIAL TRUCK HAVING A HYDRAULIC FLUID TANK

CROSS REFERENCE TO RELATED INVENTION

This application is based upon and claims priority to, under relevant sections of 35 U.S.C. § 119, German Patent Application No. 10 2018 105 009.7, filed Mar. 5, 2018, the entire contents of which are hereby incorporated by reference.

BACKGROUND

The invention relates to an industrial truck having a hydraulic fluid tank. Such tanks receive a hydraulic fluid in order to operate the hydraulic components of the industrial truck, in particular a hydraulically driven lifting apparatus. The hydraulic fluid tank must offer a high level of security against an unwanted leakage of the hydraulic fluid and, in light of the accelerations and shaking which occur during the operation of the vehicle, must be fastened in the industrial truck securely and in such a way that it is protected against external influences.

The hydraulic fluid tank has a considerable volume which receives the hydraulic fluid and which is enclosed by a generally relatively thin wall. Hydraulic lines connected to the hydraulic fluid tank are sealed with respect to the wall.

In order to fasten such hydraulic fluid tanks in the industrial truck, two different solutions have become known. In a first solution, the hydraulic fluid tank is fastened with a clamp or a similar holding device to a support of the industrial truck. The clamp or other holding device encloses a part of the hydraulic fluid tank and braces the hydraulic fluid tank with the support. As a result, the hydraulic fluid tank is fixed relative to the support, so that it cannot slip during the operation of the industrial truck.

In a second solution, the hydraulic fluid tank is at least partially surrounded by a receiving chamber of the industrial truck, which is provided for this purpose, wherein spacers, by way of example in the form of foam rubber plates, are arranged between the inner sides of the receiving chamber facing the hydraulic fluid tank and the hydraulic fluid tank. In this way, the hydraulic fluid tank is secured against slippage in the receiving chamber.

BRIEF SUMMARY OF THE INVENTION

Starting from this, the object of the invention is to provide an industrial truck, in which the hydraulic fluid tank is fastened in a particularly simple and yet secure way.

The industrial truck has a support and a hydraulic fluid tank, wherein the hydraulic fluid tank has multiple feet and the support has multiple receptacles, into each of which one of the feet is inserted.

The feet can be arranged on the underside of the hydraulic fluid tank. They can project downwards from a bottom surface of the hydraulic fluid tank. At least three feet, but also four or more feet can be present. A correspondingly arranged receptacle of the support can be assigned to each foot. The receptacles each have a free space, for example in the form of a recess or a bore which receives one of the feet or respectively a part thereof.

In order to install the hydraulic fluid tank, it is sufficient to arrange the hydraulic fluid tank with its feet in a free space of the industrial truck, which is provided for this purpose, and to insert the feet into the receptacles. If the hydraulic fluid tank is to be dismantled again, for example within the framework of maintenance work, it can be very simply removed upwards, wherein the feet are pulled out of the receptacles again. It has been established that an adequate fastening of the hydraulic fluid tank is achieved solely through the interaction of the feet with the receptacles. The positive fit brought about between each of the feet and the associated receptacle reliably prevents the hydraulic fluid tank from slipping in a lateral direction. An additional fixing of the hydraulic fluid tank in a vertical direction has proven to be superfluous. Even when accelerating more strongly or in the event of jolts, which can occur for instance when driving over a speed bump, the hydraulic fluid tank remains in its installation position.

Thanks to the particular simplicity of the fastening in design terms and with regard to the installation or dismantling, the interaction of the feet with the receptacles makes it possible to position the hydraulic fluid tank at the envisaged installation position in a particularly accurate manner. This helps to ensure that elements configured on the hydraulic fluid tank or connected thereto, for example a filler neck for filling up the hydraulic fluid tank, are likewise positioned exactly relative to the support. This is advantageous if these elements interact with further components of the industrial truck, for instance with an opening provided for the filler neck in a cover, the position of which is prescribed relative to the support. The reason for the improved positioning accuracy is that the arrangement of the hydraulic fluid tank is independent of spacers or clamps/holding devices which are to be assembled separately. Unlike these known fastening solutions, the assembly of the hydraulic fluid tank does not result in a deformation of the hydraulic fluid tank either, which can counteract an exact arrangement, for example, of a filler neck.

In one embodiment, the hydraulic fluid tank consists of plastic and is manufactured using an injection molding or rotational sintering method. During a rotational sintering method, which is also referred to as a rotational molding method, plastic granulate is melted in a countermold and the countermold is rotated, usually around different rotational axes, until the plastic material is solidified following cooling. Inexpensive production of the hydraulic fluid tank is possible with both manufacturing methods. However, there are restrictions in particular with regard to the possible shaping and wall thicknesses. For example, it is not easily possible to manufacture portions of the wall with an increased wall thickness during the rotational sintering method. This results in restrictions with respect to the dimensional stability of the hydraulic fluid tank, which can make the fastening difficult, for example with a clamp. However, these limitations are not relevant to the fastening with the aid of feet envisaged with the invention.

In one embodiment, the receptacles are completely filled by the feet in a horizontal section plane. This prevents the foot slipping laterally relative to the receptacle in a horizontal direction. A positive connection acting in all directions is created in the horizontal plane. All in all, a particularly good fixing of the hydraulic fluid tank is achieved. The receptacles and/or the feet can, in principle, have any form in the horizontal section plane, for example quadratic or rectangular. In particular, a circular cross-section is advantageous.

In one embodiment, the receptacles and/or the feet are cylindrical. In particular, they can be circularly cylindrical by way of example. A conical configuration is likewise possible.

In one embodiment, the feet project downwards from a bottom surface of the hydraulic fluid tank, wherein the bottom surface is arranged all over at a distance from the support. Optionally, all of the other surfaces, in particular the side surfaces, of the hydraulic fluid tank can observe a distance from the neighboring components of the industrial truck. This avoids damage in the region of the surfaces indicated, which can otherwise occur, for example during vibrations, if one of the surfaces rubs, by way of example, against a weld bead of a neighboring panel.

In one embodiment, recesses are configured in a bottom surface of the hydraulic fluid tank, into which recesses the feet are inserted. As a result, the feet can be fastened to the hydraulic fluid tank in a particularly simple manner by simply inserting them into the recesses. The dimensions of the recesses can thus be adjusted to the feet such that the feet are securely fixed after being pressed into the recesses. Suitable recesses, for example circularly cylindrical cavities, can be simply manufactured by appropriate shaping of the wall of the hydraulic fluid tank, in particular with the manufacturing methods already indicated. It is not absolutely necessary to enlarge the wall thickness for this.

In one embodiment, threaded inserts are arranged in a bottom of the hydraulic fluid tank, to which threaded inserts the feet are bolted. For example, threaded inserts made of metal can be used, which are already integrated during the manufacturing of the hydraulic fluid tank into the wall thereof. It is likewise possible to press the threaded inserts into suitable recesses or to glue them therein. The feet can be produced in one piece with an external thread or can be provided with a separate threaded bolt which is screwed into the threaded insert, in order to fasten the foot.

In one embodiment, the feet consist of an elastic material. The elastic material allows deformation of the feet. As a result, a simple insertion of the hydraulic fluid tank with all of the feet into the corresponding receptacles is possible, even with production tolerances. In addition, an additional non-positive connection can be attained during appropriate fitting of the feet into the receptacles. Finally, sufficient elasticity of the feet means that the hydraulic fluid tank can be insulated from oscillations. One particularly suitable, elastic material for the feet is nitrile rubber, also designated NBR which stands for nitrile butadiene rubber.

In one embodiment, the feet are manufactured in one piece with the hydraulic fluid tank. In this case, they therefore consist of the same material as the hydraulic fluid tank, in particular a plastic material. For example, during the manufacturing of the hydraulic fluid tank using one of the methods already explained, appropriate feet can easily be molded on.

In one embodiment, a downwards pointing protrusion having a discharge hose is arranged on an underside of the hydraulic fluid tank, wherein the protrusion is arranged in a lateral direction between the feet and underneath a plane, in which the feet are located. In an embodiment, the protrusion is configured to extend below the plane of the plurality of feet. This produces a secure status of the hydraulic fluid tank with an optimally positioned extraction point at the lowest point, for instance in a center of the hydraulic fluid tank. The access to the extraction point is in particular not restricted by the support.

In one embodiment, the support is part of a vehicle base frame. In principle, the support can be any supporting structure for the fastening of the hydraulic fluid tank, for example an intermediate floor or a profiled support bolted or welded to the vehicle base frame. The support can also be formed by multiple elements which are connected to one another and/or fastened to another supporting structure of the industrial truck. A particularly simple construction is produced if the support is part of a vehicle base frame, that is to say no separate support is required for the hydraulic fluid tank. In particular, the support can be a vehicle base frame component made of cast iron.

BRIEF DESCRIPTION OF THE DRAWINGS

The invention is explained in greater detail below with reference to figures, wherein.

DETAILED DESCRIPTION OF THE INVENTION

Figure 1:
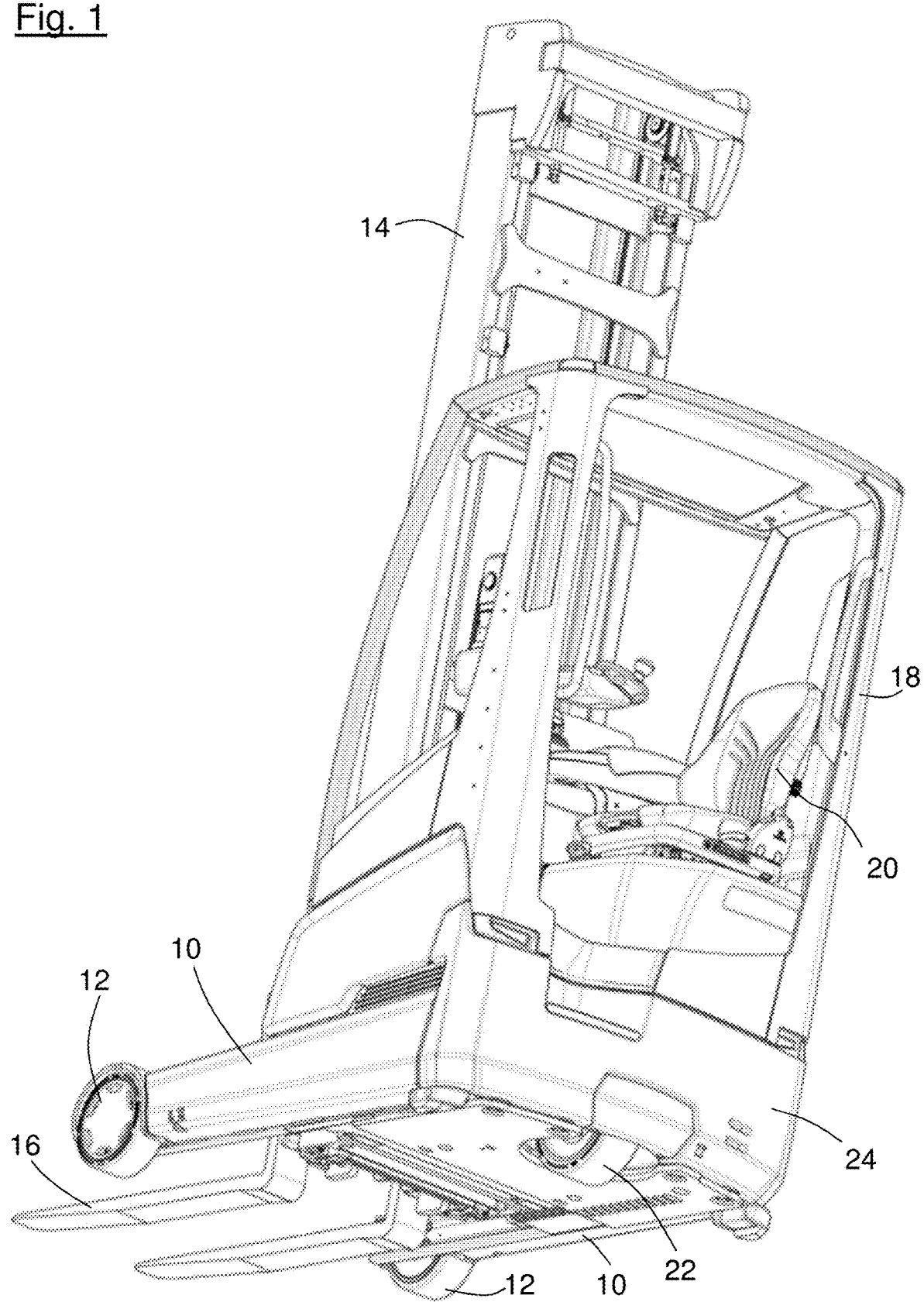
FIG. 1 illustrates a perspective view of an embodiment of an industrial truck.

The industrial truck from FIG. 1 is a reach truck having two wheel arms 10, on the front ends of each of which a load wheel 12 is arranged. A displaceably arranged lifting structure 14 having a load fork 16 is located between the two wheel arms 10. In addition, the reach truck has a driver's cab 18, in which a driver's seat 20 is arranged. A steerable driving wheel 22 can be seen on the underside of the reach truck. The vehicle base frame of the reach truck comprises a support 24 which is manufactured from cast iron and which simultaneously forms a counterweight. The hydraulic fluid tank 26, which is concealed in FIG. 1, is arranged for instance underneath the driver's seat 20.

Figure 2:
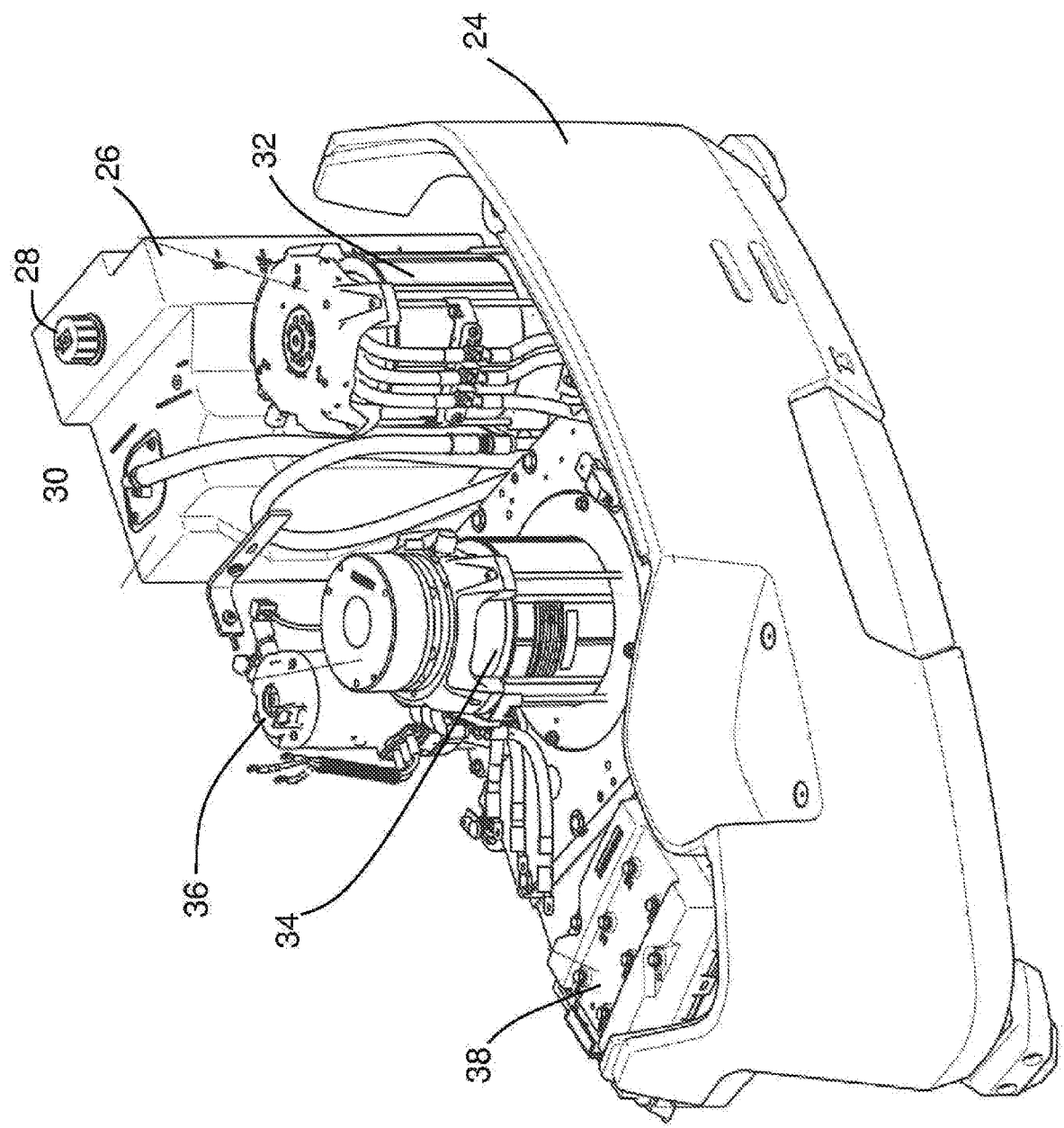
FIG. 2 illustrates a perspective view of an embodiment of a support of the industrial truck of FIG. 1 having an installed hydraulic fluid tank.

The arrangement of the hydraulic fluid tank 26 on the support 24 is shown in FIG. 2. The hydraulic fluid tank 26 has a filling opening with a screw cap 28 on its upper side. Likewise, a return line 30 opens into the hydraulic fluid tank 26 on the upper side of the hydraulic fluid tank 26.

Further components of the reach truck are likewise fastened to the support 24. These include a hydraulic motor 32, a drive propulsion motor 34 and a steering motor 36. All three motors are electric motors. Furthermore, an electronic control system 38 of the reach truck, which is likewise fastened to the support 24, can be seen in FIG. 2.

Figure 3:
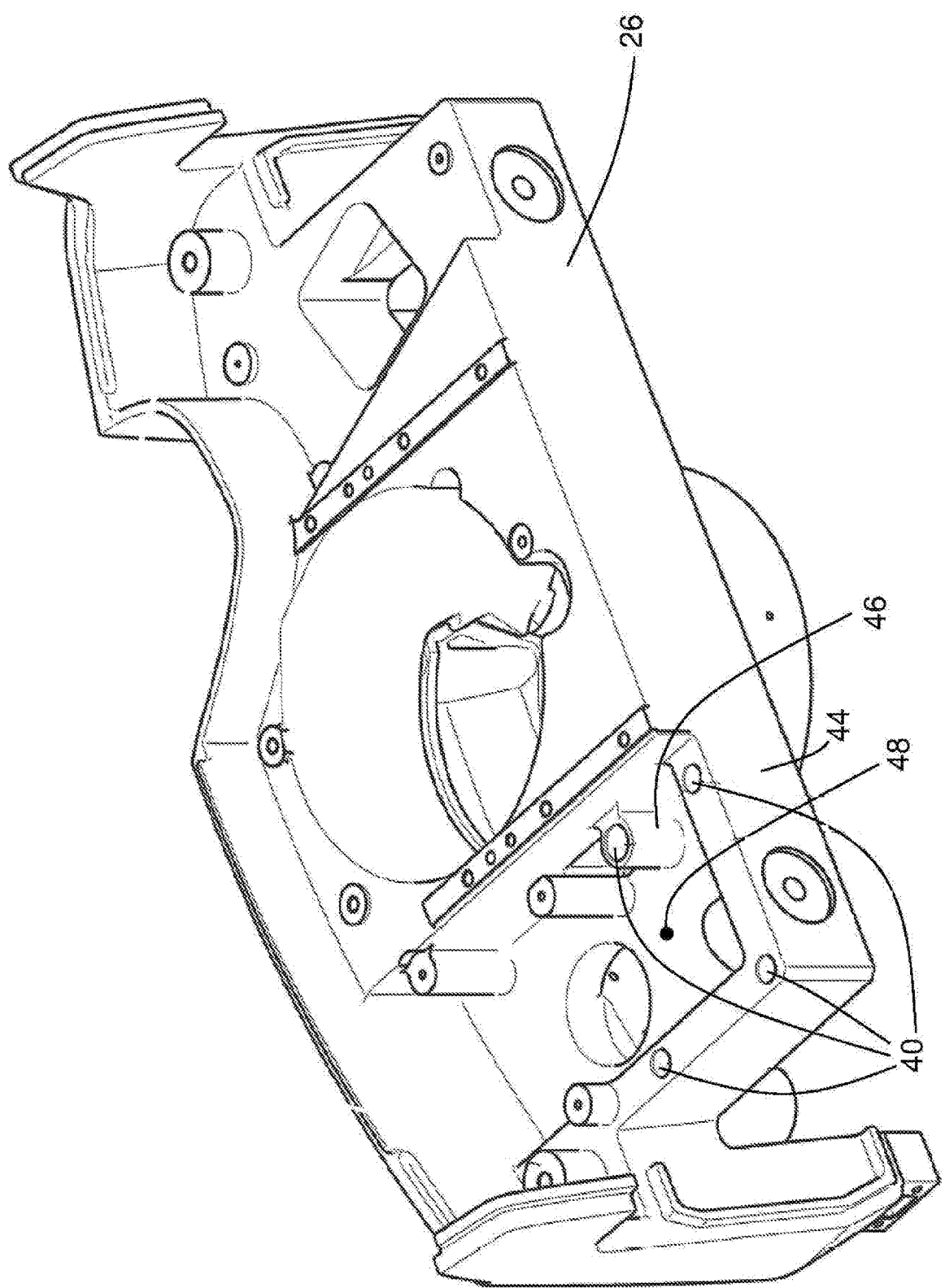
FIG. 3 illustrates a further perspective view of an embodiment of the support from FIG. 2 without an installed hydraulic fluid tank.

The support 24 is represented without the components fastened thereto in FIG. 3, where four receptacles 40 configured on the support, into which receptacles the supporting feet 42 (see FIG. 4) of the hydraulic fluid tank 26 are inserted, can be seen. In the example, the receptacles 40 are circularly cylindrical cavities which have been manufactured using the casting method during the manufacture of the support 24. Alternatively, appropriate receptacles 40 can also be introduced by way of example by milling or boring. The four receptacles 40 are situated in a horizontally arranged plane. Three of the receptacles 40 are configured in a circumferential web 44 on an external edge of the support 24; a fourth receptacle 40 is located at a distance from the web 44 on a separate protrusion 46 of the support 24. A free space 48 is located between the four receptacles 40 and underneath the plane, in which the receptacles 40 are arranged.

Figure 4:
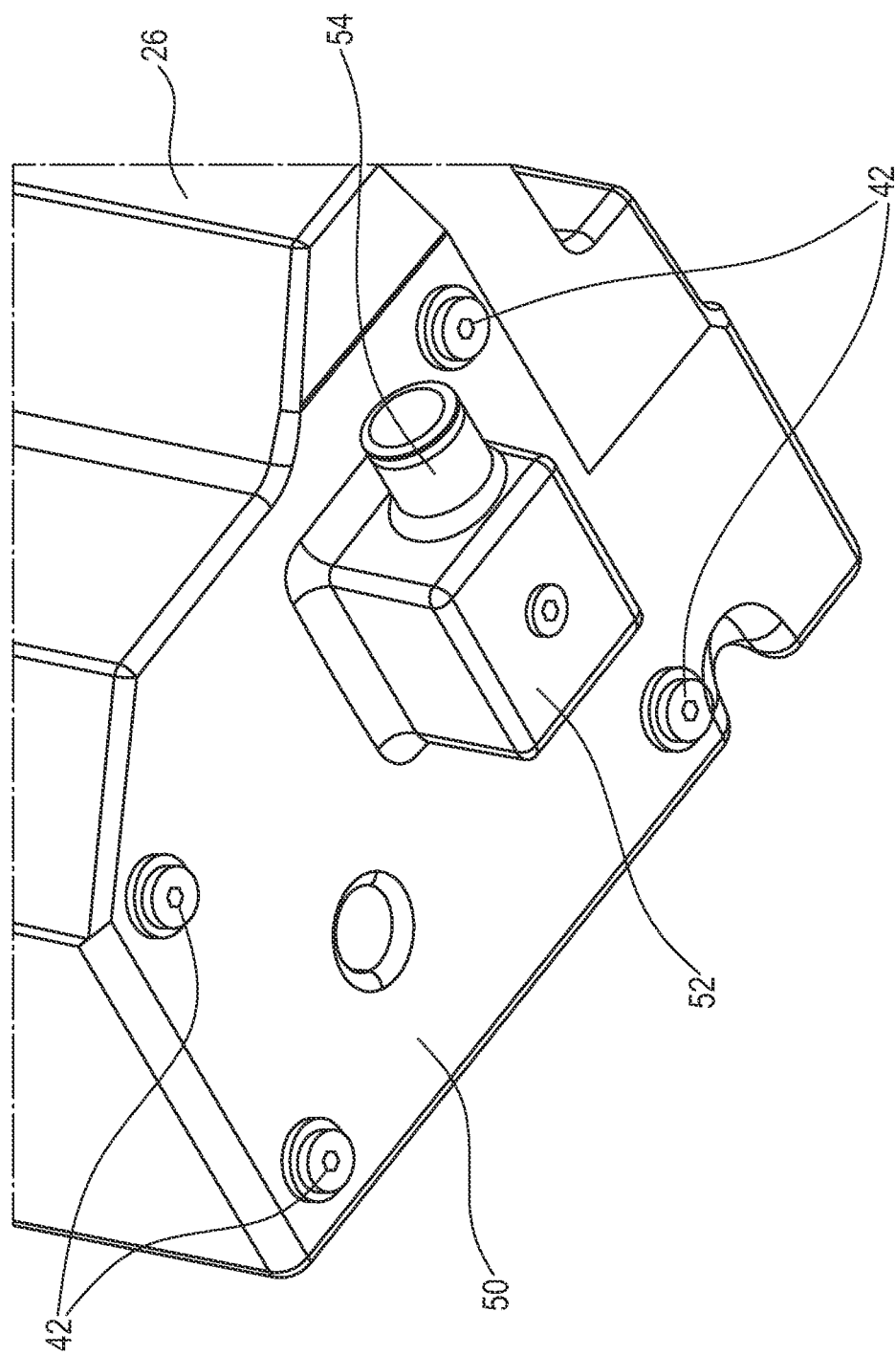
FIG. 4 illustrates a perspective view of a lower part of an embodiment of the hydraulic fluid tank from FIG. 2.

FIG. 4 shows a lower part of the hydraulic fluid tank 26 in a perspective view. A bottom surface 50, from which the four feet 42 project downwards, is configured on the underside of the hydraulic fluid tank 26. The feet 42 are circularly cylindrical and consist of nitrile rubber.

The hydraulic fluid tank 26 has a downwards pointing, box-like protrusion 52 having a socket piece 54 for fastening a discharge hose between the feet 42 on its underside. This protrusion 52 with socket piece 54 and the discharge hose connected thereto are accommodated in the free space 46 (see FIG. 3). The feet 42 are dimensioned such that they substantially completely fill the receptacles 40 if they are inserted into these.

Figure 5:
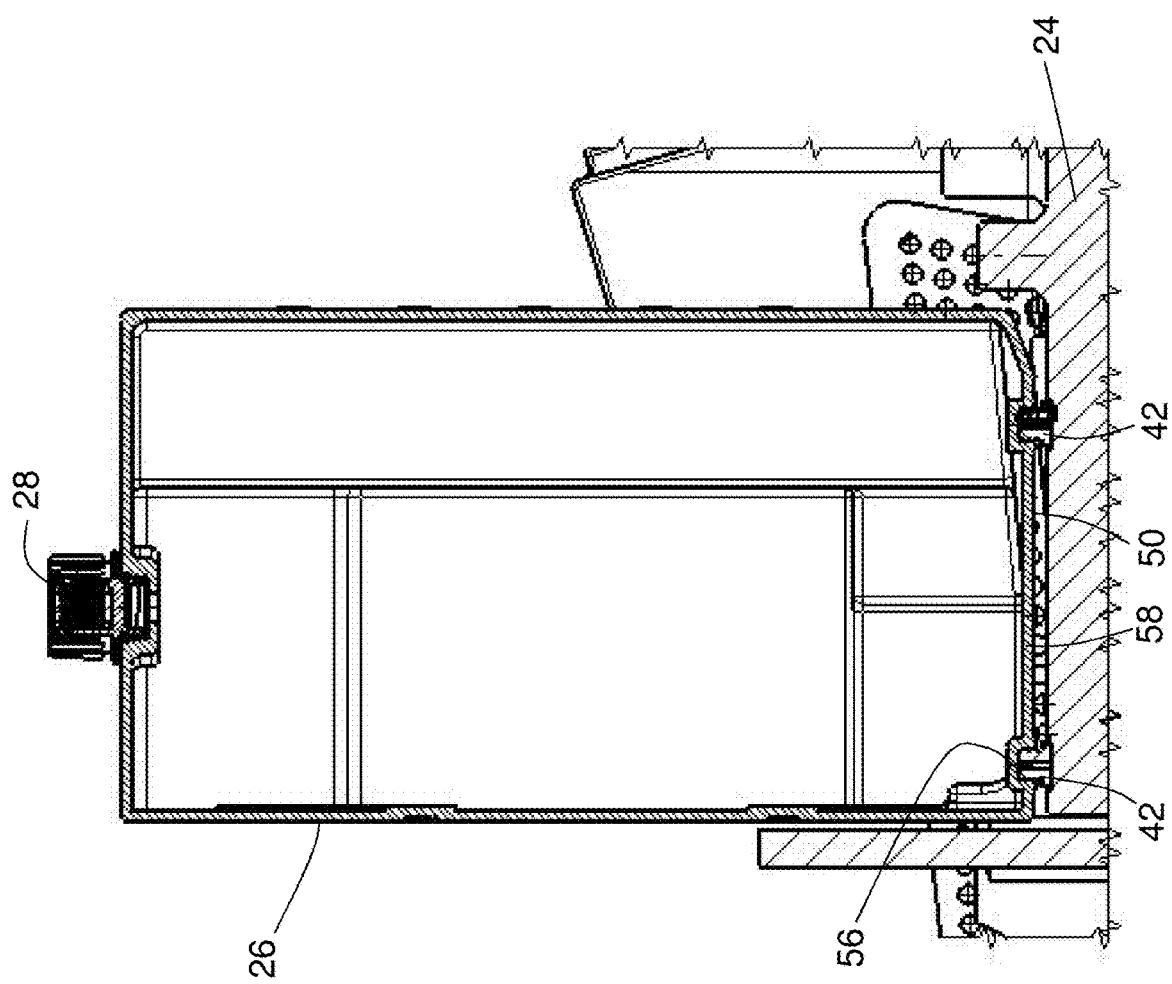
FIG. 5 illustrates a cross-sectional view of the hydraulic fluid tank from FIG. 2.

FIG. 5 shows the hydraulic fluid tank 26 in a vertical section plane, which extends through the screw cap 28 and two of the feet 42. In addition, the support 24 having two of the receptacles 40, into each of which one of the feet 42 is inserted, can be seen. Likewise, it can be clearly seen in FIG. 5 that the bottom surface 50 as well as lateral surfaces of the hydraulic fluid tank 26 observe a distance from the neighboring elements of the industrial truck, in particular from the support 24.

The feet 42 are, in addition, inserted into recesses 56 in a bottom 58 of the hydraulic fluid tank 26 and are fastened in this way to the hydraulic fluid tank 26. The wall of the hydraulic fluid tank 26 has a substantially uniform thickness.

LIST OF REFERENCE NUMERALS

10 Wheel arm
12 Load wheel
14 Lifting structure
16 Load fork
18 Driver's cab
20 Driver's seat
22 Driving wheel
24 Support
26 Hydraulic fluid tank
28 Screw cap
30 Return line
32 Hydraulic motor
34 Drive propulsion motor
36 Steering motor
38 Electronic control system
40 Receptacle
42 Foot
44 Web
26 Protrusion
48 Free space
50 Bottom surface
52 Protrusion
54 Socket piece
56 Recess
58 Bottom

The invention claimed is:

1. An industrial truck comprising:
a vehicle base frame comprising,
a support comprising a plurality of receptacles; and
a hydraulic fluid tank comprising a top surface and a bottom surface, wherein a plurality of feet are coupled at a first end to the bottom surface of the hydraulic fluid tank and project downwards from the bottom surface of the hydraulic fluid tank, wherein an opposing second end of each of the plurality of feet is configured to be inserted into one of the plurality of receptacles to secure the hydraulic tank to the support, wherein each of the plurality of feet is configured to fit into a corresponding one of the plurality of receptacles,
wherein the bottom surface of the hydraulic fluid tank is positioned at a distance from the support when the plurality of feet are inserted into the plurality of receptacles,
wherein each of the plurality of receptacles is a blind hole, and
wherein the support is positioned proximate the bottom surface of the hydraulic fluid tank.

2. The industrial truck according to claim 1, wherein the hydraulic fluid tank is comprised of plastic and is manufactured using one of an injection molding method and a rotational sintering method.

3. The industrial truck according to claim 1, wherein the plurality of receptacles are dimensioned to be completely occupied by the plurality of feet in a horizontal section plane.

4. The industrial truck according to claim 3, wherein at least one of the plurality of receptacles and the plurality of feet are cylindrical in shape.

5. The industrial truck according to claim 1, wherein each of the plurality of feet contact the bottom of the hydraulic fluid tank at a recess, and wherein each recess is formed as an single unitary component with the hydraulic fluid tank.

6. The industrial truck according to claim 5, wherein the plurality of receptacles each further comprise a threaded insert configured to couple to one of the plurality of feet.

7. The industrial truck according to claim 6, wherein the plurality of feet are comprised of an elastic material.

8. The industrial truck according to claim 1, wherein the plurality of feet and the hydraulic fluid tank are formed as a single unitary component.

9. The industrial truck according to claim 8, wherein the hydraulic fluid tank further comprises a protrusion positioned on the bottom of the hydraulic fluid tank that is configured to couple to a discharge hose, and wherein the protrusion is positioned in a lateral direction between the plurality of feet and configured to extend below a plane in which the feet are positioned.

10. The industrial truck according to claim 1, wherein each of the plurality of receptacles is configured to inhibit lateral movement of the hydraulic fluid tank.

11. The industrial truck according to claim 1, wherein an interaction between each of the plurality of feet and a corresponding receptacle creates a positive fit that secures the hydraulic fluid tank against lateral and vertical forces experienced during movement of the industrial truck without requiring fasteners or additional restraints.

12. The industrial truck according to claim 1, wherein the top surface of the hydraulic fluid tank is distal from the vehicle base frame.

13. The industrial truck according to claim 12, wherein the hydraulic fluid tank may be removed from the support by exerting an upward force on the hydraulic fluid tank to pull the plurality of feet from the plurality of receptacles.

* * * * *